United States Patent Office 3,583,972
Patented June 8, 1971

3,583,972
N-DEALKYLATION OF CYCLIC TERTIARY AMINES
Robert D. Birkenmeyer, Galesburg, and Lester A. Dolak, Kalamazoo, Mich., assignors to The Upjohn Company, Kalamazoo, Mich.
No Drawing. Filed June 11, 1969, Ser. No. 832,450
Int. Cl. C07c 47/18
U.S. Cl. 260—210R                      6 Claims

ABSTRACT OF THE DISCLOSURE

Tertiary amines possessing an N-alkyl group of 1 to 4 carbon atoms, inclusive, are dealkylated in the presence of oxygen and a catalyst in polar solvents. The process is particularly useful in the dealkylation of lincomycin-type antibiotics having an N-alkylproline moiety to give other lincomycin-type antibiotics with different antimicrobial spectra.

BACKGROUND OF THE INVENTION

Methods to remove an N-alkyl group from a tertiary amine are well known in the art [Houben-Weyl, Methoden der Organischen Chemie, vol. II, part I, p. 961–981]. Most of these methods involve high temperature and/or strong chemicals which generally result in little control of the final products. E.g. heating trimethylamine hydrochloride to 285° C. (Houben-Weyl above, p. 961) gives methyl chloride, trimethylamine and methylamine hydrochloride, but not dimethylamine. Formation of quaternary ammonium compounds and splitting the same usually results in multiple products with low yield of the desired product species. Moreover, in many processes cyclic amines undergo opening of the ring (ibid. pp. 964, 965, 971, etc.) G. T. Davis and Rosenblatt [Tetrahedron letters 38, 4085 (1968)] show that treatment of an N-methyl tertiary amine in a non-polar solvent (e.g. benzene) with oxygen in the presence of a platinum catalyst results in oxidation of the N-methyl group to the formyl derivative. It was, therefore, surprising that the reaction, when performed in a polar solvent, should give a secondary amine.

FIELD OF THE INVENTION

This invention is a novel chemical process and is particularly concerned with N-dealkylation of tertiary amines to give secondary amines. It is especially concerned with the deamination of N-heterocyclic tertiary amines such as those of the lincomycin group of compounds.

The process of the present invention, in its narrower aspects, can be illustratively represented by the following formulae:

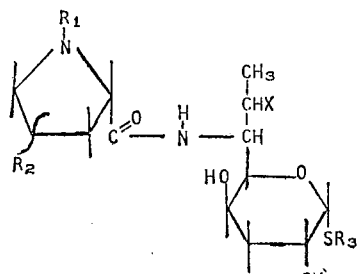

I

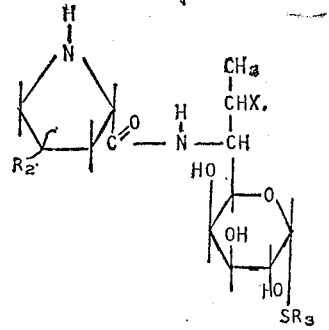

II wherein $R_1$ and $R_3$ are alkyl of 1 to 4 carbon atoms, inclusive; wherein $R_2$ is selected from the group consisting of hydrogen and alkyl of 1 to 8 carbon atoms, inclusive, and wherein X is selected from the group consisting of hydrogen, hydroxy, and halogen.

The process comprises: treating with oxygen a lincomycin compound of configuration I, often in the form of its acid addition salts, e.g. hydrochloric acid salt, in the presence of a catalyst, e.g. platinum, palladium, ruthenium, rhodium and other noble metals as well as nickel and manganese dioxide, in a polar solvent to obtain the corresponding N-dealkyl lincomycin of configuration II. The oxygen may be pure oxygen or diluted oxygen, e.g. air. In the manner related above, other N-alkyl tertiary amines can be dealkylated, e.g. promazine, chlorpromazine, morphine, cocaine, scopolamine, erythromycin, bufotene, atropine, caffeine, tropine, dimethyltryptamin and the like.

DESCRIPTION OF THE PREFERRED EMBODIMENT

Examples of alkyl groups of 1 to 4 carbon atoms inclusive, are methyl, ethyl, propyl, butyl and isomers thereof.

Examples of alkyl groups of 1 to 8 carbon atoms, inclusive, includes the above list of alkyl groups of 1 to 4 carbon atoms, inclusive, and pentyl, hexyl, heptyl, octyl and isomers thereof.

The term halogen refers to chlorine, bromine and iodine.

The new method of N-dealkylation is useful for the preparation of many products from N-alkyl compounds, often available from natural sources. It is also useful if products with large alkyl groups, e.g. 10–20 carbon atoms, are wanted which can thus be prepared by dealkylating an available N-lower-alkyl compound and alkylating with an alkyl halide, usually an alkyl iodide in which the alkyl group is of 10 to 20 carbon atoms, inclusive. For the more specific field of lincomycin antibiotics a comparison between clindamycin [=methyl 7-chloro-6,7,8-trideoxy - 6 - (1-methyl-trans-4-n-propyl-L-2-pyrrolidinecarboxamido) - 1 - thio-L-tho-α - D - galacto-octopyranoside] and N-demethylclindamycin (see Example 1) follows:

MINIMUM INHIBITORY CONCENTRATION (μg./ml.) IN VITRO

| Microorganism | Clindamycin | N-demethyl clindamycin |
|---|---|---|
| Staphylococcus aureus (2 strains) | { 0.1 | 0.025 |
|  | 0.1 | 0.0125 |
| Streptococcus faecalis | 0.8–12.4 | 0.05–1.6 |
| Escherichia coli | 8–125 | 50 |
| Klebsiella pneumoniae (2 strains) | { 64 | 8 |
|  | 16 | 2 |
| Bacillus subtilis |  | 0.1 |
| Salmonella schottmuelleri | 250 | 50 |
| Paratyphi B-4 | 125 | 16 |
| Streptococcus pyogenes | 0.025 | 0.006 |
| Clostridium tetani | 3.2 | 0.4 |

Comparison of methyl 7-chloro-6,7,8-trideoxy-6-(1-methyl-trans-4-n-pentyl-L-2-pyrrolidinecarboxamido) - 1-thio-L-threo-α-D-galacto-octopyranoside (I) and the N-demethyl (II) compound shows the following minimal inhibitory concentration (μg./ml.):

| Organism | Compound I | Compound II |
|---|---|---|
| Staphylococcus aureus | 0.05 | 0.025 |
| Streptococcus hemolyticus | 0.05 | 0.025 |
| Streptococcus faecalis | 0.4 | 0.025–1.0 |
| Escherichia coli | 50 | 12.5 |
| Proteus vulgaris | 100 | 50 |
| Klebsiella pneumoniae | 1.6 | .8 |
| Salmonella schottmuelleri | 3.2 | .8 |

It is thus shown that removal of the N-methyl group in lincomycin compounds increases the antibacterial activity of the products.

In carrying out the process of this invention a selected substrate such as a lincomycin compound of Formula I or another tertiary amine as mentioned above, often in the form of its hydrochloride or other acid addition salt, is dissolved in water or in mixtures of water with a water-miscible, organic solvent unreactive in this reaction. Organic solvents to be used with water for this reaction are lower-alkanols, e.g. methyl, ethyl, propyl, isopropyl, tert-butyl alcohols, dioxane, tetrahydrofuran, acetone or the like. The solution is then treated with oxygen (e.g. gas, air) in the presence of a catalyst selected from the group consisting of noble metals, manganese dioxide and Raney nickel. The noble metals useful for this reaction are platinum, palladium, rhodium and ruthenium. Between 0.25–10 parts by weight of catalyst is used per part of substrate. The reaction is carried out between 0° and 100° C.

In the preferred embodiment of this reaction the substrate in solution with 0.5 to 1.5 parts by weight of platinum catalyst to 1 part of substrate is treated with oxygen gas from 1 to 24 hours at room temperature (about 20–30° C.). If the conversion is incomplete (as shown for example by thin layer chromatography of an aliquot), the above treatment is repeated with fresh catalyst until the starting material has been converted. At the termination of the reaction, the product is isolated by conventional procedures, such as filtering the mixture to eliminate the catalyst and evaporating the solvent. If desired, additional crystallization and recrystallization are used to purify the product.

EXAMPLE 1

N-demethylclindamycin hydrochloride [methyl 7-chloro-6,7,8 - trideoxy - 6 - (trans - 4-n-propyl-L-2-pyrrolidine-carboxamido) - 1 - thio-L-threo-α-D-galacto-octopyranoside hydrochloride]

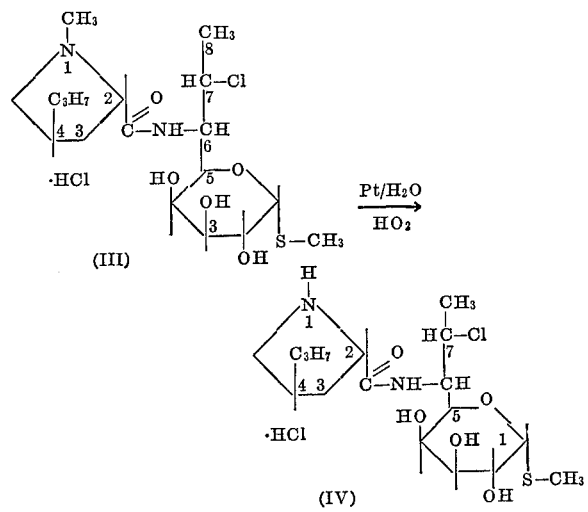

A solution of 50 g. (0.108 mole) of clindamycin hydrochloride (III), 800 ml. of water and platinum catalyst prepared by pre-reducing 40 g. of platinum oxide is stirred vigorously at 25° C. Oxygen is passed into the solution for 24 hours. Thin-layer chromatographic analysis of the reaction mixture on a silica gel plate in a solvent system composed of chloroform:methanol (6:1 by volume) indicates that a substantial amount of starting material is still present. A second 40 g. portion of platinum oxide is reduced and added and the reaction is continued for 24 hours more. A third 40 g. addition of reduced platinum oxide and 24 hours reaction period are necessary before all of the starting material is consumed. The reaction mixture is filtered, the filtrate freeze-dried and the residue is recrystallized from a minimum amount of ethanol. The resulting crystals are recrystallized from ethanol once more to give 25 g. (52%) of N-demethylclindamycin hydrochloride.

Analysis.—Calcd. for $C_{17}H_{31}ClN_2O_5S$; HCl (percent): C, 45.63; H, 7.21; N, 6.26; S, 7.17; Cl, 15.85. Found (percent): C, 44.95; H, 7.32; N, 6.08; S, 6.78; Cl, 15.77.

Rotation: $\alpha_D^{H_2O}$ +147° (c. 1.0).

EXAMPLE 2

N-demethyllincomycin [methyl 6,8-dideoxy-6-(trans-4-n-propyl-L-2-pyrrolidinecarboxamido) - 1 - thio-D-erythro-α-D-galacto-octopyranoside] hydrochloride In the manner given in Example 1, lincomycin hydrochloride [methyl 6,8-dideoxy-6-(1-methyl-trans-4-n-propyl-L-2-pyrrolidinecarboxamido) - 1 - thio - D-erythro-α-D-galacto-octopyranoside] hydrochloride is treated with oxygen in the presence of a platinum catalyst to give (in 35% yield) N-demethyllincomycin·HCl.

EXAMPLE 3

Ethyl 6,8 - dideoxy - 6 - (trans-4-n-propyl-L-2-pyrrolidinecarboxamido) - 1 - thio-D-erythro-α-D-galacto-octopyranoside hydrochloride In the manner given in Example 1, ethyl 6,8-dideoxy-6-(1-methyl - trans - 4 - n - propyl-L-2-pyrrolidinecarboxamido) - 1 - thio - D-erythro-α-D-galacto-octopyranoside hydrochloride is treated with oxygen or air in the presence of a platinum catalyst to give ethyl 6,8-dideoxy-6-(trans-4 - n - propyl - L - 2 - pyrrolidinecarboxamido)-1-thio-D-erythro-α-D-galacto-octopyranoside hydrochloride.

In the manner given in Example 2 the following compounds are converted to methyl 6,8-dideoxy-6-(trans-4-n-propyl - L - 2-pyrrolidinecarboxamido)-1-thio-D-erythro-α-D-galacto-octopyranoside hydrochloride by the use of gaseous oxygen and platinum catalyst in water: methyl 6,8-dideoxy-6-(1-ethyl - trans - 4-n-propyl-L-2-pyrrolidinecarboxamido) - 1 - thio-D-erythro-α-D-galacto-octopyranoside hydrochloride; methyl 6,8-dideoxy-6-(1-propyl-trans-4-n-propyl - L - 2 - pyrrolidinecarboxamido)-1-thio-D-erythro-α-D-galacto-octopyranoside hydrochloride; and methyl 6,8-dideoxy-6-(1-butyl - trans - 4-n-propyl-L-2-pyrrolidinecarboxamido) - 1 - thio - D - erythro-α-D-galacto-octopyranoside hydrochloride.

EXAMPLE 4

Butyl 6,8-dideoxy - 6 - (trans-4-n-propyl-L-2-pyrrolidinecarboxamido) - 1 - thio-D-erythro-α-D-galacto-octopyranoside hydrochloride In the manner given in Example 1, but using palladium on charcoal as catalyst, butyl 6,8-dideoxy-6-(1-methyl-trans-4-n-propyl-L-2 - pyrrolidinecarboxamido) - 1 - thio-D-erythro-α-D-galacto-octopyranoside hydrochloride is demethylated to give butyl 6,8-dideoxy-6-(trans-4-n-propyl-L-2-pyrrolidinecarboxamido) - 1 - thio - D - erythro-α-D-galacto-octopyranoside hydrochloride.

EXAMPLE 5

L-proline hydrochloride from L-(N-isopropyl)proline hydrochloride

In the manner given in Example 1, L-(N-isopropyl) proline hydrochloride is treated with oxygen at room temperature in the presence of a rhodium catalyst to give L-proline hydrochloride.

EXAMPLE 6

Trans-4-hexyl-L proline hydrochloride

In the manner given in Example 1, trans-4-hexyl-1-isobutyl L-proline is converted with oxygen in the presence of a ruthenium on charcoal catalyst to trans-4-hexyl-L-proline.

EXAMPLE 7

Xanthine from caffeine or theobromine (A) In the manner given in Example 1, caffeine is treated in water solution with oxygen in the presence of platinum to give xanthine.

(B) One gram of theobromine in 200 ml. of water is treated for 6 hours with oxygen in the presence of platinum catalyst to give xanthine.

We claim:
1. A process for the production of N-dealkyl proline compounds from N-lower alkyl proline compounds which comprises: treating a cyclic N-lower-alkyl proline compound, wherein the lower alkyl group is of 1 to 4 carbon atoms, inclusive, in an aqueous solvent with oxygen in the presence of a platinum catalyst at a temperature between 0° and 100° C. to obtain the corresponding N-dealkylated proline compound.

2. A process according to claim 1 for the production of N-dealkylated lincomycin compounds from a lincomycin compound which comprises: treating such lincomycin compound in water with oxygen in the presence of a catalyst selected from the group consisting of platinum, palladium, rhodium, ruthenium, manganese dioxide and nickel at a temperature between 0° and 100° C. to obtain the corresponding N-dealkylated lincomycin.

3. The process of claim 2 in which the catalyst is a platinum catalyst.

4. A process according to claim 2 wherein the starting material is methyl 6,8-dideoxy-6-(1-methyl-trans-4-n-propyl-L-2-pyrrolidiecarboxamido) - 1 - thio-D-erythro-α-galacto-octopyranoside hydrochloride and the final product is methyl 6,8-dideoxy-6-(trans-4-n-propyl-L-2-pyrrolidinecarboxamido) - 1 - thio-D-erythro-α-D-galacto-octopyranoside hydrochloride.

5. The process of claim 4 in which the catalyst is a platinum catalyst.

6. A process according to claim 2 wherein the starting material is methyl 7-chloro-6,7,8-trideoxy-6-(1-methyl-trans-4-n-propyl-L-2-pyrrolidinecarboxamido) - 1 - thio-L-threo-α-D-galacto-octopyranoside and the final product is methyl 7-chloro-6,7,8-trideoxy-6-(trans-4-n-propyl-L-2-pyrrolidinecarboxamido) - 1 - thio - L - threo-α-galacto-octopyranoside.

OTHER REFERENCES

Moller: "Houben Weyl," 1957, pp. 985–988.

LEWIS GOTTS, Primary Examiner

J. R. BROWN, Assistant Examiner

U.S. Cl. X.R.

260—210E, 243AA, 256, 285, 292, 326.15, 326.3

UNITED STATES PATENT OFFICE
CERTIFICATE OF CORRECTION

Patent No. 3,583,972            Dated     June 8, 1971

Inventor(s)       Robert D. Birkenmeyer et al.

It is certified that error appears in the above-identified patent and that said Letters Patent are hereby corrected as shown below:

Column 2, line 58, "tho" should read -- threo --. Column 3, in the Table, "0.025-1.0" should read -- .025-0.1 --. Column 4, line 54, "didexoy" should read -- dideoxy --. Column 6, line 9, "pyrrolidie-" should read -- pyrrolidine --; line 10, "α-galacto" should read -- α-D-galacto --.

Signed and sealed this 21st day of December 1971.

(SEAL)
Attest:

EDWARD M. FLETCHER, JR.            ROBERT GOTTSCHALK
Attesting Officer                  Acting Commissioner of Patents